US012161600B2

(12) United States Patent
Wilt et al.

(10) Patent No.: US 12,161,600 B2
(45) **Date of Patent: *Dec. 10, 2024**

(54) APPARATUS FOR PELVIC FLOOR MUSCLE TRIGGER POINT THERAPY

(71) Applicant: Plus EV Holdings Inc., North Kansas City, MO (US)

(72) Inventors: Aaron Wilt, North Kansas City, MO (US); Amanda Olson, Medford, OR (US)

(73) Assignee: Plus EV Holdings Inc., North Kansas City, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/845,528

(22) Filed: Jun. 21, 2022

(65) Prior Publication Data

US 2022/0347048 A1 Nov. 3, 2022

Related U.S. Application Data

(63) Continuation of application No. 16/524,877, filed on Jul. 29, 2019, now Pat. No. 11,376,188.

(51) Int. Cl.
*A61H 23/02* (2006.01)

(52) U.S. Cl.
CPC ..... *A61H 23/02* (2013.01); *A61H 2201/0153* (2013.01); *A61H 2201/1628* (2013.01); *A61H 2201/5007* (2013.01); *A61H 2205/087* (2013.01)

(58) Field of Classification Search
CPC .. A61H 23/00–06; A61H 223/002–045; A61H 19/00–50; A61H 21/00; A61H 39/00–086; A61H 2039/005
USPC .......................... 601/46; D24/200, 211–215
See application file for complete search history.

(56) References Cited

U.S. PATENT DOCUMENTS

| | | | | |
|---|---|---|---|---|
| 1,612,343 A | | 12/1926 | Amussen | |
| D340,527 S | | 10/1993 | Goodell | |
| D405,536 S | | 2/1999 | Haynes | |
| D423,676 S | | 4/2000 | Lazio | |
| D436,181 S | | 1/2001 | Lazio | |
| D444,566 S | * | 7/2001 | Thomas | D24/214 |

(Continued)

OTHER PUBLICATIONS

Definition of "tangent" from Merriam-Webster Online Dictionary. <https://www.merriam-webster.com/dictionary/tangent> Accessed on Apr. 26, 2023. (Year: 2023).*

(Continued)

*Primary Examiner* — Valerie L Woodward
*Assistant Examiner* — Paige Kathleen Bugg
(74) *Attorney, Agent, or Firm* — Workman Nydegger

(57) ABSTRACT

An apparatus for pelvic floor muscle trigger point therapy is disclosed. The apparatus comprises a wand to facilitate the release of one or more trigger points in a pelvic floor muscle of a patient. The wand comprises a central portion extending between a first end and a second end. The central portion includes a first bend and a second bend wherein the first bend is formed between a first end region and a first central region. The second bend is formed between the first central region and a second central region. The first end is configured to be vaginally insertable while the second end configured to be rectally insertable. A power source in electrical communication with one or more switches to selectively control a vibration element during use.

20 Claims, 3 Drawing Sheets

(56) References Cited

U.S. PATENT DOCUMENTS

| | | | | | |
|---|---|---|---|---|---|
| D456,909 | S | | 5/2002 | Szabo | |
| D475,793 | S | | 6/2003 | Tinsley | |
| D554,270 | S | | 10/2007 | Ano | |
| D595,409 | S | | 6/2009 | Takashima | |
| 7,695,489 | B2 | | 4/2010 | Brockman | |
| D687,962 | S | | 8/2013 | Divittorio et al. | |
| D688,381 | S | | 8/2013 | Marshall | |
| D696,414 | S | | 12/2013 | Tabe et al. | |
| D698,452 | S | * | 1/2014 | Tai | D24/215 |
| D698,936 | S | | 2/2014 | Pudhnum | |
| D706,440 | S | | 6/2014 | Hahr et al. | |
| D706,441 | S | | 6/2014 | Hahr et al. | |
| D712,057 | S | | 8/2014 | Mcdonald, Jr. et al. | |
| D712,563 | S | | 9/2014 | Pursel et al. | |
| D720,862 | S | | 1/2015 | Mcdonald, Jr. et al. | |
| D743,043 | S | * | 11/2015 | Cao | D24/215 |
| D750,797 | S | | 3/2016 | Mannheim et al. | |
| D768,307 | S | | 10/2016 | Hetzel | |
| D768,309 | S | | 10/2016 | Hetzel | |
| D792,980 | S | | 7/2017 | Olivares et al. | |
| D809,151 | S | | 1/2018 | Li | |
| D812,240 | S | * | 3/2018 | Janapol | D24/215 |
| D826,421 | S | * | 8/2018 | Janapol | D24/215 |
| D833,637 | S | | 11/2018 | Marshall | |
| D839,441 | S | | 1/2019 | Harashima et al. | |
| D841,828 | S | | 2/2019 | Haslinger et al. | |
| D844,162 | S | | 3/2019 | Janapol | |
| D845,501 | S | * | 4/2019 | Janapol | D24/215 |
| D877,904 | S | | 3/2020 | Takashima | |
| D917,061 | S | | 4/2021 | Wilt et al. | |
| D945,636 | S | | 3/2022 | Sletten | |
| D946,163 | S | | 3/2022 | Dempsey | |
| 11,376,188 | B2 | * | 7/2022 | Wilt | A61H 19/44 |
| D971,426 | S | | 11/2022 | Lieberman-Lu et al. | |
| D975,870 | S | | 1/2023 | Li | |
| D982,770 | S | | 4/2023 | Shirasawa | |
| D988,528 | S | | 6/2023 | Dunham | |
| D1,008,481 | S | | 12/2023 | Rouindej et al. | |
| 2004/0186344 | A1 | * | 9/2004 | Jannuzzi | A61H 21/00 600/38 |
| 2004/0249324 | A1 | | 12/2004 | Louis | |
| 2007/0083238 | A1 | * | 4/2007 | Brockman | A61N 1/36007 607/1 |
| 2014/0088469 | A1 | | 3/2014 | Wise | |
| 2014/0378758 | A1 | * | 12/2014 | Mankin | A61H 19/44 600/38 |
| 2019/0209426 | A1 | | 7/2019 | Swartz | |
| 2021/0022949 | A1 | * | 1/2021 | Janapol | A61H 23/0263 |
| 2021/0030620 | A1 | | 2/2021 | Wilt et al. | |

OTHER PUBLICATIONS

Amazon, "Intimate Rose Pelvic Wand Trigger Point", Date First Available: Sep. 27, 2018. https://www.amazon.com/Intimate-Rose-Trigger-Release-Muscles/dp/B07HR3GL6V (Year: 2018).

Amazon, "VWELL_Flex Pelvic Floor Muscle Trigger Point Relaxer", Date First Available: Jul. 22, 2022. https://www.amazon.com/Trigger-Activator-Flexible-Myofascial-Tightness/dp/BOB7CCDW91/ref=cm_cr_arp_d_product_top?ie=UTF8 (Year: 2022).

Intimaterose, "Intimate Rose Pelvic Wand", Earliest Review Date: Apr. 3, 2019. https://www.intimaterose.com/products/pelvic-wand (Year: 2019).

Youtube, "How to us the Intimate Rose", Published Date: Jul. 13, 2022. https://www.youtube.com/watch?v=e5BZ3kCAg6Q (Year: 2022).

* cited by examiner

APPARATUS FOR PELVIC FLOOR MUSCLE TRIGGER POINT THERAPY

CROSS-REFERENCE TO RELATED APPLICATIONS

This application is a Continuation of U.S. patent application Ser. No. 16/524,877 filed on Jul. 29, 2019, entitled "Apparatus For Pelvic Floor Muscle Trigger Point Therapy," which application is expressly incorporated herein by reference in its entirety.

TECHNICAL FIELD

The embodiments generally relate to medical devices for relieving pelvic discomfort in men and women.

BACKGROUND

Pelvic pain is a common problem in men and women alike. Conventional medicine has treated pelvic pain in various ways depending on the source of pain. In some patients, an organ-specific focus is required for treating pelvic pain caused by inflammation in the bladder, prostate gland, or uterus. Also, the pudendal nerve may be entrapped, requiring the release of the nerve. In other instances, an autoimmune process or psychiatric problems may be the cause of discomfort in the pelvic region.

In recent years, it has been found that the majority of pelvic pain is related to muscle dysfunction and muscle-related strain. In particular, myofascial pelvic pain (MFPP) can be diagnosed in women by performing vaginal digital palpation of the pelvic floor muscles during routine gynecological exams to examine for the presence of myofascial pelvic pain and trigger points.

Myofascial trigger points are localized painful lumps or nodules in the muscles or associated connective tissue known as fascia, which may be found in various areas of the pelvic floor. In particular, the pelvic floor muscles consist of the superficial muscle layer and the deep muscle layer, which may each contribute to pelvic discomfort. Treatment may be performed in a medical setting or at home. Previously known self-treatment techniques have proven ineffective for an internal trigger point release. The current arts include devices not designed for trigger point release and may be dangerous if attempted due to their unsuitable sizes and configurations.

SUMMARY OF THE INVENTION

This summary is provided to introduce a variety of concepts in a simplified form that is further disclosed in the detailed description of the embodiments. This summary is not intended to identify key or essential inventive concepts of the claimed subject matter, nor is it intended for determining the scope of the claimed subject matter.

The embodiments described herein provide an apparatus for pelvic floor muscle trigger point therapy. The apparatus comprises a wand to facilitate the release of one or more trigger points in a pelvic floor muscle of a patient. The wand comprises a central portion extending between a first end and a second end. The central portion includes a first bend and a second bend wherein the first bend is formed between a first end region and a first central region. The second bend is formed between the first central region and a second central region. The first end is configured to be vaginally insertable while the second end is configured to be rectally insertable. A power source in electrical communication with one or more switches to selectively control a vibration element during use.

The apparatus is insertable into the vagina or rectum of the user by orienting the upper surface of the wand upwards. Once inserted, the apparatus may be rotated to access pelvic floor muscles in various regions. Using the bends, the first and second ends aid in the access and release of the trigger points.

In one aspect, the wand includes an exterior surface constructed of medical-grade silicone to reduce discomfort during insertion.

In one aspect, the first end comprises a tapered portion to facilitate vaginal insertion and the release of the one or more trigger points. The second end comprises a rounded edge to facilitate rectal insertion and the release of the one or more trigger points.

In one aspect, the first bend is arranged to have a more acute angle than the second bend.

In one aspect, the apparatus is configured to aid in the release of the trigger points of the puborectalis muscle and the obturator internus muscle.

In one aspect, a diameter of the first end region is larger than a diameter of the second end region.

BRIEF DESCRIPTION OF THE DRAWINGS

A complete understanding of the present embodiments and the advantages and features thereof will be more readily understood by reference to the following detailed description when considered in conjunction with the accompanying drawings wherein.

DETAILED DESCRIPTION

Figure 1:
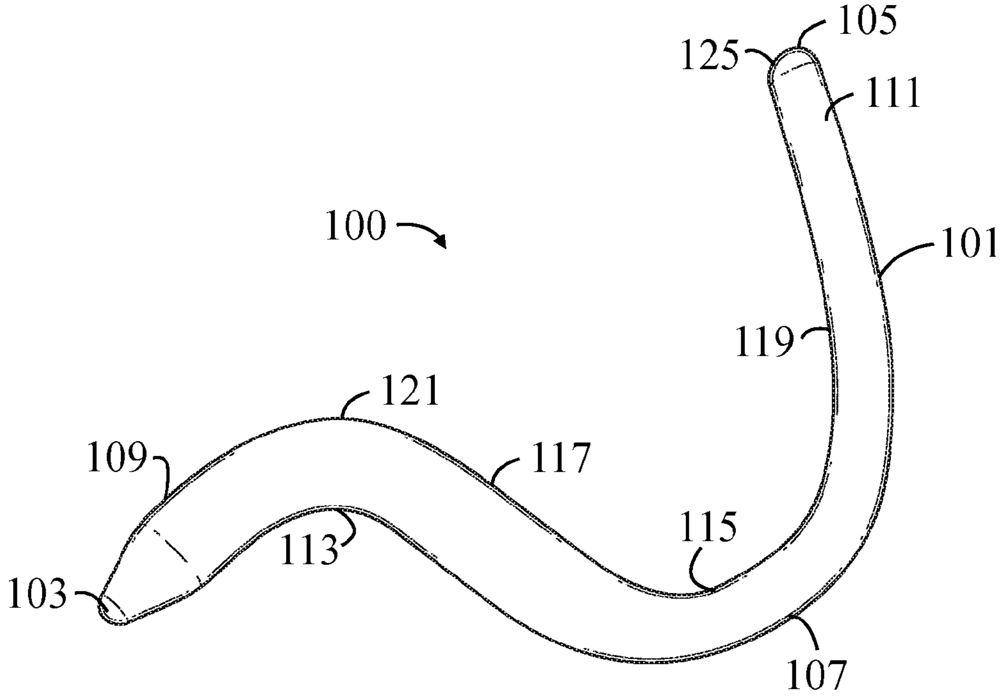
FIG. 1 illustrates a top plan view of the pelvic trigger point release apparatus, according to some embodiments.

The specific details of the single embodiment or variety of embodiments described herein are to the described apparatus and methods of use. Any specific details of the embodiments are used for demonstration purposes only, and no unnecessary limitations or inferences are to be understood therefrom.

Before describing in detail exemplary embodiments, it is noted that the embodiments reside primarily in combinations of components and procedures related to the apparatus and method of use thereof. Accordingly, the apparatus components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments described herein relate to a pelvic trigger point release apparatus suitable for pelvic trigger point release and similar therapies related to myofascial pelvic pain. The apparatus is inserted into the body cavity or applied externally to relieve pain experienced by the patient. The apparatus may perform strumming, stroking, and other methods of trigger point release on the internal pelvic trigger points and other discomforts associated with pelvic floor pain.

As used herein, the term “user” relates to a patient, a care provider (such as a physician, osteopath, nurse, or physical therapist), or another person who uses the apparatus to relieve myofascial pelvic pain. The user may provide care to others or may utilize the apparatus for self-treatment.

Pelvic floor trigger points may include areas of the muscles of the levator ani, coccygeus, pubococcygeus, puborectalis, obturator internus, piriformis, and other internally accessed trigger points. The apparatus may also stretch or otherwise stimulate contracted or shortened the internal pelvic floor muscles. The pelvic floor trigger points may be taut bands within the muscle, which can be present at the surface of the muscle, inside the muscle, in the belly of the muscle, or at the attachment(s) of the muscle. Further, the associated connective tissue may be affected by the apparatus provided in the various embodiments herein.

Figure 2:
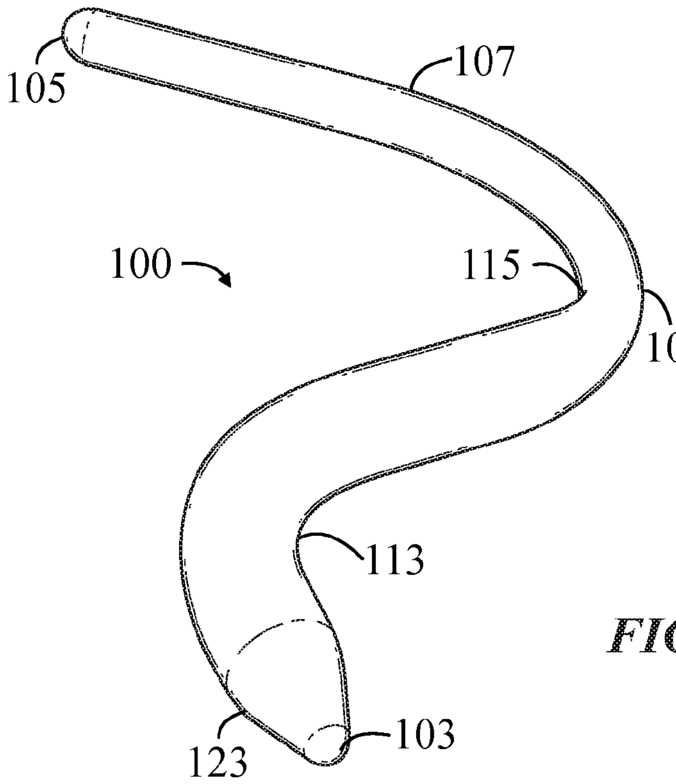
FIG. 2 illustrates a perspective view of the pelvic trigger point release apparatus, according to some embodiments.
Figure 3:
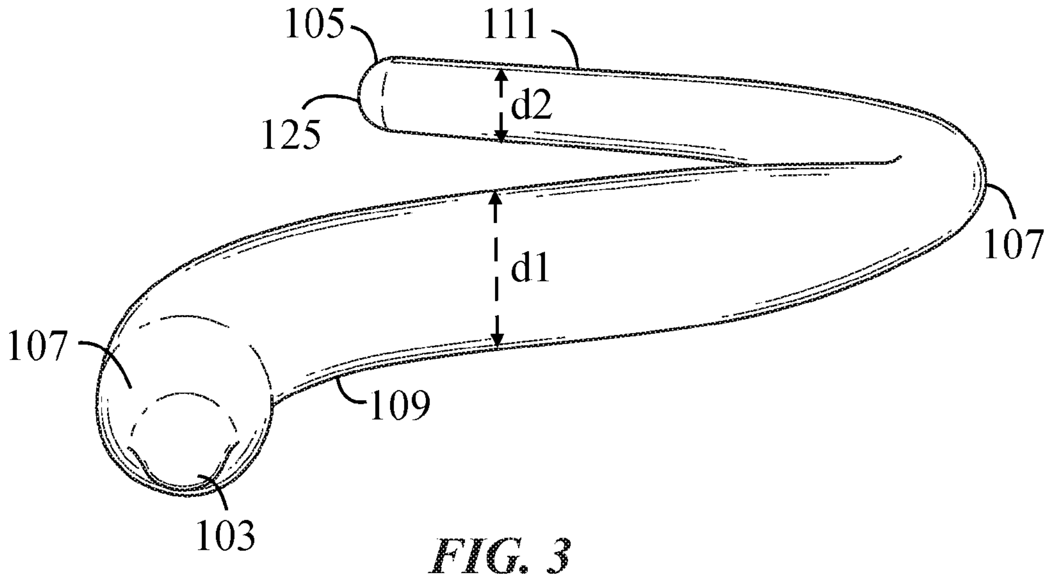
FIG. 3 illustrates a front perspective view of the pelvic trigger point release apparatus, according to some embodiments.

In reference to FIGS. 1-3, there is shown an apparatus 100 in accordance with some embodiments. The apparatus 100 comprises a substantially s-shaped rod or wand 101 having a first end 103 and a second end 105. A central portion 107 is continuous between the first end 103 and the second end 105 such that the wand 101 is a continuous member. The first end region 109 which extends from the central portion 107 and terminates at the first end 103, has a larger diameter (shown as d1 in FIG. 3) than the diameter of the second end region 111 (shown as d2 in FIG. 3) which terminates in the second end 105. The central portion 107 comprises a first bend 113 and a second bend 115, which are integral in permitting the first end 103 and the second end 105 to access and effectively relieve the trigger point(s).

In further reference to FIGS. 1-3, the angle, and orientation of the first bend 113 with respect to the second bend 115 is important for properly relieving pain in the various pelvic floor muscles. In such, the first bend 113 is more acute than the second bend 115. The first bend 113 forms a substantially 90° bend between the first end region 109 and a first central region 117. The first bend may be greater or less than 90°. However, the angle of the first bend is less than the angle of the second bend 115, which is more obtuse. The second bend 115 is formed between the first central region 117 and the second central region 119.

In some embodiments, the first end 103 is configured for vaginal insertion into a patient due to the arrangement of the first bend 113 being advantageous for accessing the pelvic floor muscles in the vagina. The user inserts the first end 103 while orienting the apparatus 100 such that the upper surface 121 (as shown in FIG. 1) is facing upwards. Once inserted, the user may rotate the apparatus 100 to access the front, side, or rear pelvic floor muscles. As shown in FIG. 2, the first end 103 comprises a tapered portion 123 terminating in a rounded edge to facilitate the release of the trigger point.

In some embodiments, the second end 105 is configured for rectal insertion into a patient due to the decreased diameter of the second end region 111 as well as the second bend 115 providing an advantageous configuration for releasing trigger points of the pelvic floor muscles which are accessed via the rectum. The rounded edge 125 of the second end 105 is useful for properly releasing trigger points in the pelvic floor muscles.

The apparatus 100 is substantially slender such that the diameter is sufficient to provide strength to the apparatus 100 during insertion and to allow the user to apply pressure during treatment protocols without undue deformation of the apparatus 100. Further, the apparatus 100 r should be slender enough in diameter so that vaginal and/or rectal insertion of the apparatus 100 does not result in undue discomfort to the patient, while allowing the patient ability to feel the engagement of the first end 103 or second end 105 of the apparatus with a trigger point.

The apparatus 100 may be hollow or solid in construction, or a combination of each to allow for the disposal of internal components such as actuators, vibration elements, electrical circuitry, power sources, etc.

In some embodiments, the apparatus has an exterior constructed of medical-grade silicone, which is advantageous for providing a smooth surface to reduce discomfort when inserting the device and during use.

Figure 4:
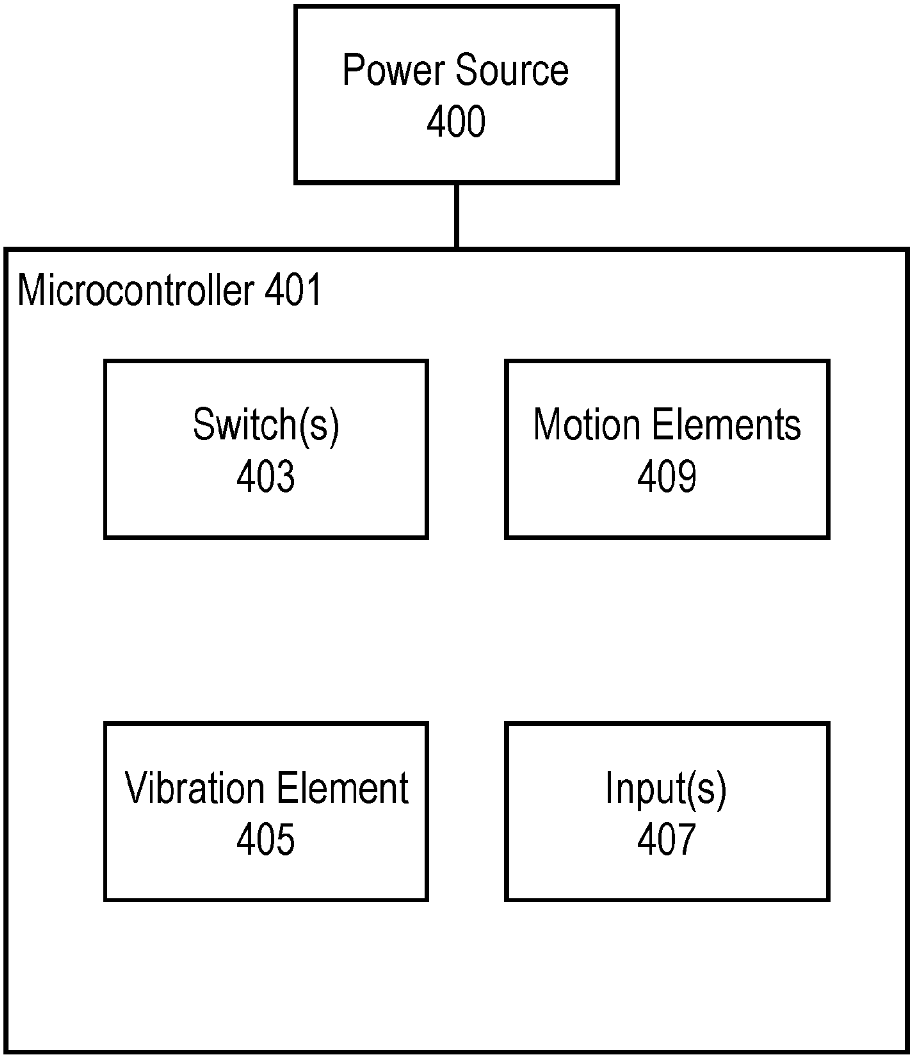
FIG. 4 illustrates a block diagram of the electrical components, according to some embodiments.

FIG. 4 illustrates a block diagram of the electrical components comprising a power source 400 in electrical communication with a microcontroller 401 in electrical communication with one or more switches 403 which allow the user to turn the apparatus on and off, or to cycle through various operating functions of the apparatus. Operating functions may include vibration settings such as vibration patterns and vibration intensity controlled by the vibration element 405. One or more inputs 407 may be provided, which may allow the user to alter the configuration, size, or shape of the apparatus. For example, the inputs 407 may affect motion elements 409 (such as actuators) in the first and second bends to permit the user to alter the angle of each bend simultaneously or independently. Other user-selectable characteristics may include heating and cooling settings, motion settings, or other functionalities known in the arts.

Many different embodiments have been disclosed herein, in connection with the above description and the drawings. It will be understood that it would be unduly repetitious and obfuscating to describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

An equivalent substitution of two or more elements can be made for anyone of the elements in the claims below or that a single element can be substituted for two or more elements in a claim. Although elements can be described above as acting in certain combinations and even initially claimed as such, it is to be expressly understood that one or more elements from a claimed combination can in some cases be excised from the combination and that the claimed combination can be directed to a subcombination or variation of a subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A wand structured to facilitate a release of one or more trigger points in a pelvic floor muscle of a user, said wand comprising:

a first end region that extends to a first terminal end of the wand;

a central portion; and a second end region that extends to a second terminal end of the wand;

wherein:

at least a portion of the wand maintains a question mark-like shape that approximates that of a question mark, the question mark-like shape of the at least the portion of the wand includes (i) an open curved upper portion, (ii) a linear bottom portion that, upon being linearly extended, intersects the open curved upper portion, and (iii) a transition portion between the open curved upper portion and the linear bottom portion, the transition portion approximating a 90 degree bend, the linear bottom portion is formed of at least a part of the first end region, the transition portion is formed of a first curved portion included in the central portion, the open curved upper portion is formed of at least a second curved portion included in the central portion, the second curved portion comprises a tapering portion that tapers in diameter, the tapering portion being closer to the transition portion than to the second terminal end, one of the first end region or the second end region is structured for vaginal insertion and the other one of the first end region or the second end region is structured for rectal insertion, and a length of the open curved upper portion is longer than a combination of a length of the linear bottom portion and a length of the transition portion.

2. The wand of claim 1, wherein an exterior surface of the wand is constructed of silicone.

3. The wand of claim 1, wherein one of the first end region or the second end region has a tapered end.

4. The wand of claim 3, wherein the other one of the first end region or the second end region has a rounded end.

5. The wand of claim 1, wherein the wand includes one or more hollow portions and one or more solid portions.

6. The wand of claim 1, wherein the wand is sufficiently rigid to avoid shape deformation during use.

7. The wand of claim 1, wherein:

the tapering portion progressively tapers from a first diameter to a second diameter, a majority of the open curved upper portion has the second diameter, and a location on the open curved upper portion where the tapering portion achieves the second diameter is at a position that is proximate to a vertex of the second curved portion.

8. The wand of claim 1, wherein the tapering portion is disposed between the transition portion and a vertex of the second curved portion.

9. A wand structured to facilitate a release of one or more trigger points in a pelvic floor muscle of a user, said wand comprising:

a first end region that extends to a first terminal end of the wand;

a central portion; and a second end region that extends to a second terminal end of the wand;

wherein:

at least a portion of the wand has a question mark-like shape that approximates that of a question mark, the question mark-like shape of the at least the portion of the wand includes (i) an open curved upper portion, (ii) a linear bottom portion that, upon being linearly extended, intersects the open curved upper portion, and (iii) a transition portion between the open curved upper portion and the linear bottom portion, the transition portion approximating a 90 degree bend, the linear bottom portion is formed of at least a part of the first end region, the transition portion is formed of a first curved portion included in the central portion, the open curved upper portion is formed of at least a second curved portion included in the central portion, the second curved portion comprises a tapering portion that tapers in diameter, the tapering portion being closer to the transition portion than to the second terminal end, and a length of the open curved upper portion is longer than a combination of a length of the linear bottom portion and a length of the transition portion.

10. The wand of claim 9, wherein an exterior surface of the wand is constructed of silicone.

11. The wand of claim 9, wherein the wand includes one or more of a heating element or a cooling element.

12. The wand of claim 9, wherein the wand includes one or more actuators that permit one or more portions of the wand to temporarily move.

13. The wand of claim 9, wherein the wand includes a vibration element.

14. The wand of claim 9, wherein one of the first end region or the second end region is structured for vaginal insertion and has a larger diameter than the other one of the first end region or the second end region, which is structured for rectal insertion.

15. A wand structured to facilitate a release of one or more trigger points in a pelvic floor muscle of a user, said wand comprising:

a first end region that extends to a first terminal end of the wand;

a central portion; and a second end region that extends to a second terminal end of the wand;

wherein:

the wand is sufficiently rigid to avoid shape deformation during use, at least a portion of the wand, due to said rigidity, maintains a question mark-like shape that approximates that of a question mark, the question mark-like shape of the at least the portion of the wand includes (i) an open curved upper portion, (ii) a linear bottom portion that, upon being linearly extended, intersects the open curved upper portion, and (iii) a transition portion between the open curved upper portion and the linear bottom portion, the transition portion approximating a 90 degree bend, the linear bottom portion is formed of at least a part of the first end region, the transition portion is formed of a first curved portion included in the central portion, the open curved upper portion is formed of at least a second curved portion included in the central portion, the second curved portion comprises a tapering portion that tapers in diameter, the tapering portion being closer to the transition portion than to the second terminal end, one of the first end region or the second end region is structured for vaginal insertion and the other one of the first end region or the second end region is structured for rectal insertion, whichever one of the first end region or the second end region that is structured for vaginal insertion has a larger diameter than the other one of the first end region or the second end region that is structured for rectal insertion, and a length of the open curved upper portion is longer than a combination of a length of the linear bottom portion and a length of the transition portion.

16. The wand of claim 15, wherein the first end region has a tapered end.

17. The wand of claim 16, wherein the second end region has a rounded end.

18. The wand of claim 15, wherein the wand includes a power source.

19. The wand of claim 18, wherein the power source powers a vibration element and/or one or more actuators.

20. The wand of claim 18, wherein a first actuator is included as a part of the wand and is located proximately to the transition portion, and wherein a second actuator is included as a part of the wand and is located proximately to the open curved upper portion.

* * * * *